March 26, 1968   C. C. FALLON ET AL   3,375,405
CIRCUIT FOR REMOVING VOLTAGE SURGES FROM POWER LINES
Filed July 20, 1965
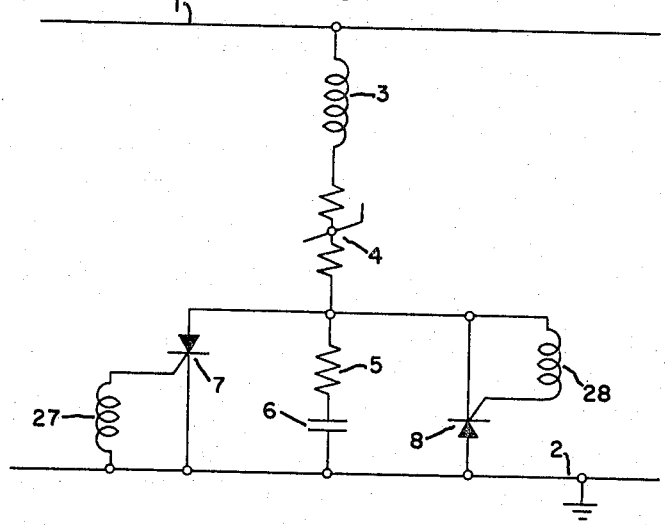
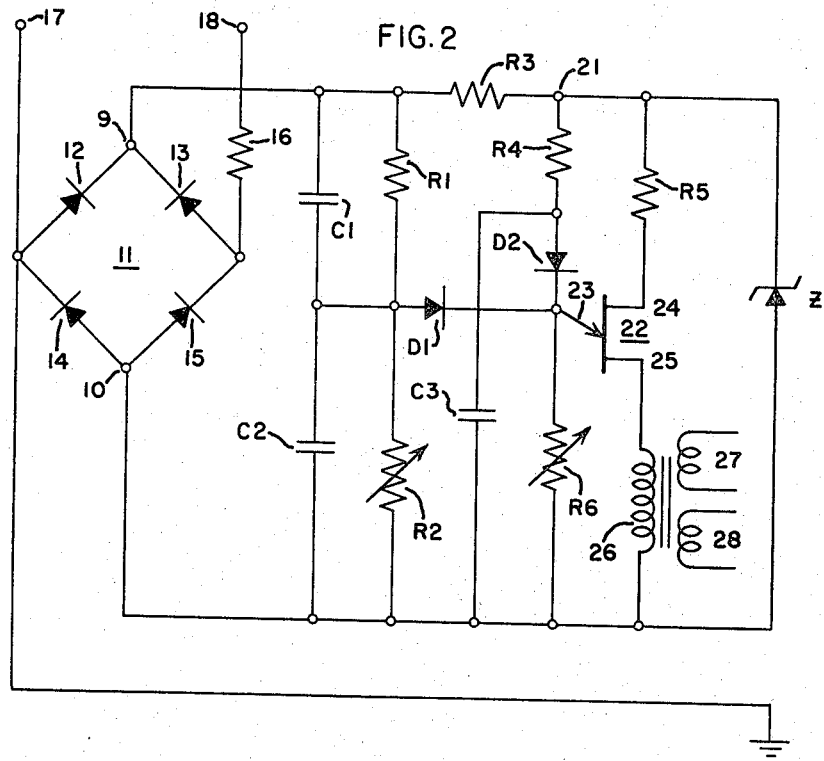
INVENTORS:
CHRISTOPHER C. FALLON,
RICHARD C. WEISCHEDEL,
BY
THEIR ATTORNEY.

United States Patent Office 3,375,405
Patented Mar. 26, 1968

3,375,405
CIRCUIT FOR REMOVING VOLTAGE SURGES FROM POWER LINES
Christopher Chiffee Fallon and Richard C. Weischedel, Oklahoma City, Okla., assignors to General Electric Company, a corporation of New York
Filed July 20, 1965, Ser. No. 473,379
4 Claims. (Cl. 317—16)

ABSTRACT OF THE DISCLOSURE

A circuit is disclosed for removing voltage surges by momentarily shunting them from the line. The shunt path for the voltage surges includes a resistor having a negative characteristic of current versus resistance, this resistor being connected in series with a pair of gate controlled rectifiers connected reversely in parallel. A firing circuit for the gate controlled rectifiers includes a uni-junction transistor through which triggering energy is connected to the gate controlled rectifiers.

---

The present invention relates to an electrical protective device and more particularly to a device which provides continuous protection to electronic equipment from damage due to power line voltage surges.

In installations utilizing expensive electronic equipment fed from long single or multi-phase power lines there is always the risk of costly damage to such electronic equipment caused by voltage transients occurring on the power lines. A typical cause of these transients is lightning or, in the case of military installations, nuclear detonations may bring about these damaging power surges. Typically the voltage surges which must be protected against are of very short duration and are of a magnitude only slightly greater than the normal line voltage magnitude. Thus, a protective device for this equipment must not only be extremely sensitive to abnormal power line voltages within close tolerances but must also be able to remove the surges from the power lines without interrupting normal "follow-on" current flow to the electronic equipment. Further, a satisfactory protective device must be able to quickly reset itself so that subsequent surges occurring shortly after the initial surge are likewise removed from the line.

It is therefore an object of this invention to provide an electric surge arrester which continuously samples a power line to determine the presence of voltage surges and then effectively removes them from the line.

It is another object of this invention to provide an electric surge arrester which provides a current path away from a power line for abnormally high voltage transients while maintaining normal current to the electronic equipment being protected.

It is still another object of this invention to provide an electric surge arrester which provides continuous protection to electrical equipment by immediately resetting itself after a power surge has been removed.

Briefly, these objects are obtained in a device which includes a resistor with a negative current-resistance characteristic in series with the anode-cathode circuit of a gate controlled rectifier, the series combination being connected between the power line and ground. The gate controlled rectifier is set to trigger at a preset abnormal voltage level and the negative current-resistance characteristic resistor allows the gate controlled rectifier to conduct heavy surge currents during the transient high voltage period. Immediately after the high voltage surge has passed, the resistance of the negative current-resistance characteristic resistor increases thereby limiting the current flowing through the gate controlled rectifier to a low value, thus allowing the normal "follow-on" current to flow through the power line to the electronic equipment. By reducing the current flow through the gate controlled rectifier after the transient phase is over, the negative current-resistance characteristic resistor hastens turn-off of the gate controlled rectifier thus allowing the protective system to quickly reset.

The novel and distinctive features of the invention are set forth in the appended claims. The invention itself together with further objects and advantages thereof may best be understood by reference to the following description and accompanying drawings in which:

FIGURE 1 illustrates a circuit diagram of the surge current path to ground of the invention including a gate controlled rectifier and a negative current-resistance characteristic resistor; and FIGURE 2 illustrates a preferred embodiment of a gate controlled rectifier firing circuit used to trigger the gate controlled rectifier illustrated in FIGURE 1.

Referring to FIGURE 1, there is illustrated a surge arresting circuit according to this invention connected between a power line 1 and ground represented by reference numeral 2. Included in series between power line 1 and ground 2 is a coil 3 used to limit the rate of current build-up, a negative current-resistance resistor 4, a resistor 5, and a capacitor 6. Resistor 4 is of the type that displays a low resistance to high voltages and, conversely, displays a relatively high resistance to low voltages. Connected between the junction of resistors 4 and 5 and ground 2 is a pair of gate controlled rectifiers 7 and 8 connected reversely in parallel. Respectively connected between the gate and cathode electrodes of the gate controlled rectifiers 7 and 8 are a pair of pulse transformer secondary windings 27 and 28.

The gate controlled rectifiers 7 and 8 are of the type that a small trigger current induced in the secondary windings 27 and 28 will cause the anode to cathode path of the rectifiers to switch into their low impedance state. Thus, should there be a positive potential with respect to the gate electrode at the anode electrodes of gate controlled rectifiers 7 and 8, a triggering current induced by windings 27 and 28 will cause the rectifiers 7 and 8 to conduct current from the line 1 to ground 2. By virtue of the fact that the gate controlled rectifiers 7 and 8 are connected reversely in parallel, either positive or negative surges on the power line 1 can be shunted to ground.

The invention in its broadest sense requires that the resistor 4 be of the type that displays a negative current-resistance characteristic. Silicon-carbide resistors display such a characteristic and have proven to be useful in carrying out this invention. One type of silicon-carbide resistor made by the General Electric Company and given the trade name "Thyrite" has been found to be desirable and has been used as an embodiment of applicants' invention. For purposes of ease in explanation, the description of this invention will be hereinafter set forth using the term "Thyrite" instead of a negative current-resistance characteristic resistor. This is not to say that the invention in its broadest sense depends on the utilization of "Thyrite" and, as a matter of fact, the invention should be construed to include the utilization of any resistor exhibiting such characteristics in applicants' novel circuit.

In practicing the best mode of applicants' invention, silicon controlled rectifiers, SCR's, are used as the gate controlled rectifiers 7 and 8. During the transient state two practical difficulties inherent in present day SCR's are encountered. The first of the SCR limitations is that the initial rate of change of current through the SCR's during initial conduction cannot be instantaneous but rather must be limited to a maximum value. Although this maximum value is great enough so as not to detract from the efficiency of applicants' invention, it may be desirable to include a $di/dt$ limiting coil in series with the SCR's to limit the rate of change of current during the transient state. In FIGURE 1 the $di/dt$ coil 3 is shown in series with the "Thyrite" resistor 4.

The second of the practical limitations inherent in SCR's is that a rapid change of voltage with respect to time across an SCR may cause it to fire spuriously at a time when the magnitude of the line voltage does not exceed the pre-set trigger potential for the SCR. Thus, in a preferred embodiment of applicants' invention, it may be necessary to include a suppressing circuit to limit the rate at which voltage pulses may increase in order to insure that rapid rise time voltage pulses in excess of a maximum value do not spuriously cause the SCR's to conduct. In FIGURE 1 a $dv/dt$ suppressing circuit comprising the series connected resistor 5 and capacitor 6 is shown connected in parallel with the gate controlled rectifiers 7 and 8. It should be understood that the utilizations of the $di/dt$ limiting coil 3 and the $dv/dt$ suppressing circuit comprising the resistor 5 and capacitor 6 are entirely due to present day practical limitations of silicon controlled rectifiers and is therefore not to be construed as a necessary limitation to the scope of applicants' invention. Those skilled in the art may substitute other means to compensate for these limitations in the silicon controlled rectifiers or may even eliminate them altogether in certain applications without departing from the spirit and scope of applicants' invention.

FIGURE 2 illustrates an SCR uni-junction transistor firing circuit suitable for use in a preferred embodiment of the present invention. A full-wave rectifier indicated generally by reference numeral 11 and comprising diodes 12, 13, 14, and 15 is connected across a power line through a limiting resistor 16 at a pair of terminals 17 and 18. A pair of output terminals 9 and 10 of full-wave rectifier 11 are connected across a series connected ripple filter comprising a pair of capacitors C1 and C2 and also across a pair of series connected resistors R1 and R2. Terminal 9 is also connected through a current limiting resistor R3 to a junction 21 of a resistor R4, and another resistor R5, and the anode electrode of a zener diode Z. The junction of capacitors C1 and C2 is directly connected to the junction of resistors R1 and R2 and also to the cathode electrode of a diode D1. In order to set the voltage at the junction of capacitors C1 and C2 and resistors R1 and R2, resistor R2 is made adjustable. In this configuration capacitors C1 and C2 and resistors R1 and R2 form a voltage dividing network across the output of full-wave rectifier 11.

The anode electrode of diode D1 is directly connected to the anode electrode of a diode D2 and also to the emitter electrode 23 of a uni-junction transistor 22. The cathode electrode of diode D2 is connected to the terminal of the resistor R4 opposite that connected to junction 21 and is also connected to a capacitor C3, the other side of which is connected to output terminal 10 of full-wave rectifier 11.

To aid in setting a bias voltage at the emitter electrode 23 of the uni-junction transistor 22, an adjustable resistor R6 is connected between emitter electrode 23 and output terminal 10 of full-wave rectifier 11.

One of the base electrodes 24 of the uni-junction transistor 22 is connected to the side of the resistor R5 opposite that connected to junction 21. The other base electrode 25 of uni-junction transistor 22 is connected to the primary winding 26 of a pulse output transformer, the opposite side of which is connected to output terminal 10 of full-wave rectifier 11. The two secondary windings 27 and 28 of the pulse transformer are shown coupled to the primary winding 26 and are connected to the gate-cathode circuits of SCR's 7 and 8 shown in FIGURE 1. A zener diode Z is connected between junction 21 and output terminal 10 to regulate the voltage across uni-junction transistor 22 to a constant value.

In the operation of the firing circuit of FIGURE 2, the line voltage present at terminals 17 and 18 is fully rectified by full-wave rectifier 11 and is presented to output terminals 9 and 10 as an almost pure DC potential. Any AC component of the potential present at terminals 9 and 10 is removed by the ripple filter action of capacitors C1 and C2. The DC voltage is reduced to the zener breakdown voltage of zener diode Z by the action of dropping resistor R3. The zener diode provides a regulated DC voltage across uni-junction transistor 22. Resistors R4 and R6 act as a voltage divider and provide a potential at emitter electrode 23 for uni-junction transistor 22 which is maintained, under normal conditions, at just below the firing potential of the uni-junction transistor. This potential can be adjusted by varying variable resistor R6. The firing voltage of uni-junction transistor 22 is a fraction of the zener voltage which may typically be two-thirds or three-quarters. By the voltage divider action of resistors R1 and R2, the voltage at the anode of the diode D1 is normally set just below that present at its cathode so that it is back biased and nonconductive. This voltage can be set by adjustment of resistor R2. Under normal conditions capacitors C1 and C2 are charged to the voltages present across the resistors R1 and R2, respectively, and capacitor C3 is charged to the voltage present across resistor R6 plus the very slight forward voltage drop that may be present across diode D2.

When a line surge occurs, the rectified voltage across the terminals 9 and 10 develops a potential at the junction of R1 and R2 which sufficiently overcomes the voltage at the cathode of diode D1 so as to remove its back bias, thereby allowing the diode to conduct. When diode D1 is rendered conductive a path is provided from capacitor C1 to emitter electrode 23 of uni-junction transistor 22, thereby allowing capacitor C1 to supply sufficient energy to trigger the uni-junction transistor into conduction. Conduction of the uni-junction transistor provides a discharge path for the energy stored in capacitor C3, the discharge path being through diode D2, the emitter electrode 23, the base electrode 25, and the primary winding 26 of the pulse output transformer. The energy stored in capacitor C3 therefore provides the triggering potential for SCR's 7 and 8 shown in FIGURE 1.

In addition to the ripple filter action of capacitors C1 and C2, they perform a more important function, namely to provide a very fast response to voltage surges on the line. Since the line surges which are to be protected against are of very high frequency, capacitors C1 and C2 provide a very low impedance to them in the transient sense. Thus, while providing a very high impedance to the normal DC at the output of terminals 9 and 10 of full-wave rectifier 11, these capacitors provide an instantaneous low impedance path to the positive pulses at these terminals produced by line surges.

Since it is desirable to dissipate the greater proportion of the surge energy through "Thyrite" resistor 4 and SCR 7 or 8 rather than in the firing circuit, it is necessary that the firing circuit have a very high input impedance. It can be seen that the triggering current provided by capacitors C1 and C2 would normally find a low impedance path around the uni-junction transistor through capacitor C3 were it not for the blocking action of diode D2. Thus, with diode D2 in the circuit the input impedance is largely determined by the parallel combination of resistors R1, R2, and R6. Since R1 and R2 are typically chosen in a preferred embodiment to be very much larger than R6, R6 represents the principal input impedance. This resistance is sufficiently high that the total input impedance of the firing circuit is large compared to the impedance of the "Thyrite" resistor.

In the operation of the surge arresting circuit shown in FIGURE 1, depending upon whether the surge voltage is positive or negative, the firing circuit of FIGURE 2 will render either gate controlled rectifier 7 or 8 conductive. Since at the time of initial conduction of the appropriate controlled rectifier there is present an abnormally high potential on the power line 1, "Thyrite" resistor 4 will present a relatively low impedance to this high potential thereby providing a shunt path to ground. Since the firing circuit is of relatively high input impedance as compared to the "Thyrite" resistor circuit, the majority of the surge energy will be shunted through the "Thyrite" resistor to ground. The electronic equipment at the receiving end of the power line, therefore, does not receive this surge potential and is thereby protected.

After the surge has dissipated, the potential on the power line decreases to a normal value thereby causing the "Thyrite" resistor to travel up its current-resistance curve and present a high impedance between the power line and ground, limiting follow-on current and normal line current is allowed to flow the to electronic equipment thus providing continuous service. Also, due to the fact that the current flow through the "Thyrite" resistor is substantially reduced after the surge has passed, the voltage at the anode electrode of the conducting gate controlled rectifier is substantially reduced thereby causing the gate controlled rectifier to cease conducting and enter its high impedance state. At this point the triggering circuit is reset and is ready to provide protection against subsequent line surges that may occur.

It will be apparent that surge protection for a multiphase system can be readily obtained by providing a "Thyrite" surge circuit similar to FIGURE 1 for each phase in the system. In a preferred embodiment applicants have found that a separate firing circuit such as that shown in FIGURE 2 is required for each "Thyrite" surge circuit being utilized. Thus, protection for multi-phase systems requires a plurality of triggering circuits and surge circuits, the plurality being equal in number to the number of phases in the system. However, it will be apparent to those skilled in the art that other embodiments of applicants' invention may utilize a single firing circuit for all the phases in the system.

It is therefore seen that applicants have provided a surge arresting circuit which enables continuous service and protection to electrical equipment and which is rapid in its response to abnormally high voltages. The triggering circuit can be set at any predetermined level as can the response and recovery times therefor.

Although the circuits and methods of operation of the circuits have been described in a preferred embodiment, it should be understood that various modifications and other arrangements will be obvious to those skilled in the art. Thus, it is not intended that applicants be limited to the embodiment described but rather should be entitled to the full scope of the appended claims.

What is claimed:

1. An electric surge arresting circuit for shunting surge energy from a power line to a point of fixed reference potential comprising, a first resistor exhibiting a negative current-resistance characteristic, first and second gate controlled rectifiers connected reversely in parallel, said first resistor and said first and second gate controlled rectifiers connected in series between said power line and said point of fixed reference potential, a firing circuit connected between said power line and said gate controlled rectifiers for triggering said gate controlled rectifiers into their low impedance state in response to voltage surges occurring on said power line, said firing circuit including a uni-junction transistor, first means responsive to electrical surges on said power line for causing said uni-junction transistor to go into its low impedance state, second means for supplying energy to triggering said gate controlled rectifiers into the low impedance state, said second means supplying the triggering energy through said uni-junction transistor when it is in its low impedance state, and means electrically isolating said first means from said second means.

2. The circuit according to claim 1 wherein said first means comprises an RC circuit and a first diode connected in series between said power line and said uni-junction transistor, said diode being normally nonconductive but being rendered conductive to supply energy from said RC circuit to said uni-junction transistor when said RC circuit presents a potential to said first diode in excess of a predetermined amount in response to electrical surges on said power line.

3. The circuit according to claim 1 wherein said second means comprises a capacitor connected to said uni-junction transistor, said capacitor discharging energy through said uni-junction transistor to said gate controlled rectifiers when said uni-junction transistor is switched into its low impedance state.

4. The circuit according to claim 3 wherein said means for isolating said first means from said second means comprises a second diode connected between said first diode and said capacitor and poled in such a direction that current flowing through said first diode cannot flow through said second diode.

References Cited

UNITED STATES PATENTS

| 3,197,676 | 7/1965 | Jones _____ 317—33 |
| 3,246,206 | 4/1966 | Chowdhuri _____ 317—33 X |
| 3,260,894 | 7/1966 | Denault _____ 317—16 X |
| 3,273,018 | 9/1966 | Goldberg _____ 317—20 |
| 3,281,638 | 10/1966 | Crawford _____ 317—33 X |
| 3,317,792 | 5/1967 | Sutherland _____ 317—33 X |

MILTON O. HIRSHFIELD, *Primary Examiner.*

R. V. LUPO, *Assistant Examiner.*